(12) United States Patent  (10) Patent No.: US 8,457,458 B2
Kadar-Kallen et al.  (45) Date of Patent: Jun. 4, 2013

(54) IMAGING INTERFACE FOR OPTICAL COMPONENTS

(75) Inventors: Michael Aaron Kadar-Kallen, Harrisburg, PA (US); David William Cormany, Dauphin, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 354 days.

(21) Appl. No.: 12/842,768

(22) Filed: Jul. 23, 2010

(65) Prior Publication Data

US 2012/0020619 A1     Jan. 26, 2012

(51) Int. Cl.
G02B 6/26      (2006.01)
G02B 6/38      (2006.01)

(52) U.S. Cl.
USPC .............. 385/33; 385/52; 385/53; 385/60; 385/74

(58) Field of Classification Search
USPC .............. 385/33, 74, 60, 79, 116, 119, 52, 385/53, 56, 70, 72, 76, 77, 78, 59
See application file for complete search history.

(56) References Cited

U.S. PATENT DOCUMENTS

| | | | |
|---|---|---|---|
| 4,563,057 A | | 1/1986 | Ludman et al. |
| 4,625,333 A | * | 11/1986 | Takezawa et al. ........... 398/139 |
| 4,856,863 A | * | 8/1989 | Sampsell et al. ............... 385/4 |
| 4,925,267 A | * | 5/1990 | Plummer et al. ............. 385/74 |
| 5,042,335 A | * | 8/1991 | Ciboldi et al. ................ 82/117 |
| 5,111,571 A | * | 5/1992 | Ciboldi et al. ............. 29/407.07 |
| 5,142,602 A | * | 8/1992 | Cabato et al. ................. 385/87 |
| 6,095,974 A | * | 8/2000 | Shemwell et al. ........... 600/310 |
| 6,438,290 B1 | * | 8/2002 | Bietry et al. .................. 385/33 |
| 7,260,298 B2 | * | 8/2007 | Furman et al. .............. 385/115 |
| 7,604,417 B2 | * | 10/2009 | Nielson et al. ................ 385/78 |
| 2007/0292083 A1 | * | 12/2007 | Nielson et al. ................ 385/78 |
| 2012/0020619 A1 | * | 1/2012 | Kadar-Kallen et al. ........ 385/33 |

FOREIGN PATENT DOCUMENTS

| | | |
|---|---|---|
| EP | 0 005 683 A2 | 11/1979 |
| EP | 1 020 742 A2 | 7/2000 |
| FR | 2 672 696 A1 | 8/1992 |
| WO | WO 03/071326 A1 | 8/2003 |

OTHER PUBLICATIONS

International Search Report, International Application No. PCT/US2011/001267, International Filing Date Jul. 18, 2011.

* cited by examiner

*Primary Examiner* — Brian Healy

(57) ABSTRACT

The invention pertains to an optical interface employing optics (e.g., lenses) that image the beams rather than collimate the beams. More specifically, each connector at an interface includes optics, e.g., a lens, adapted to receive a diverging beam emanating from field point and image the beam to an image point at a predetermined distance from the imaging lens. A connector employing such optics may, for instance, be effectively mated to either a similar connector with the same optics or to a connector having no lens. Specifically, it may effectively be mated to a second connector having no lens via a second connector structure that places the receiving optical component at the image point of the focusing optics of the first connector. Alternately, such a connector may be effectively mated to a second connector having an identical lens to the first connector provided that the first and second connector structures are adapted to mate such that the image points of the two lenses are coincident.

19 Claims, 2 Drawing Sheets

IMAGING INTERFACE FOR OPTICAL COMPONENTS

FIELD OF TECHNOLOGY

The invention pertains to optoelectronics. More particularly, the invention pertains to a method and apparatus for interfacing two optical components, e.g., optical fibers or optical waveguides, to each other.

BACKGROUND

It is typically the case that an optical signal transported over an optical transport, such as an optical fiber, must be coupled between that optical fiber and another optical fiber or an optoelectronic device. Typically, the end face of the optical fiber is outfitted with an optical connector of a given, standardized form factor, e.g., MT, which connector can be coupled to a mating optical connector on the other fiber or optoelectronic device.

Optical cables that are connected to each other through a pair of mating connectors may comprise a single optical fiber. However, more and more commonly, optical cables contain a plurality of optical fibers and the light in each optical fiber in the cable is coupled through a pair of mating connectors to a corresponding optical fiber in another cable or a corresponding optical receiver or transmitter in an optoelectronic component.

Optical connectors generally must be fabricated extremely precisely to ensure that as much light as possible is transmitted through the interfacing fibers so as to minimize signal loss during transmission. In a typical optical fiber, the light is generally contained only within the core of the fiber, which typically may be about 10 microns in diameter for a single-mode fiber or about 50 microns in diameter for a multi-mode fiber. A speck of dust typically is greater than 10 microns in cross section. Accordingly, a single speck of dust at the interface of two fibers can substantially or fully block the optical signal in a fiber from getting through the connectors.

Accordingly, it is well known to use expanded beam connectors, especially in situations where it is likely that connections will be made in the field, and particularly in rugged or dusty environments. Expanded beam connectors include optics (e.g., lenses) of the connector (i.e., the end of the connector that is designed to be connected to another optical connector or optoelectronic device). Depending, of course, on the direction of light travel through the connector, the lens either expands a beam exiting a fiber to a greater cross section for coupling to the corresponding lens of a mating connector or images a beam entering the lens from a corresponding lens of another connector to an image point in the face of a fiber. Generally, such interfaces employ collimating optics so that the light beams between the optics of the two mating connectors are collimated and of a spot size much larger than the core of the fiber from which it emanated (and the core of the fiber into which it is being directed).

SUMMARY

The invention pertains to an optical interface employing optics (e.g., lenses) that image the beams rather than collimate the beams. More specifically, each connector at an interface includes optics, e.g., a lens, adapted to receive a diverging beam emanating from field point and image the beam to an image point at a predetermined distance from the imaging lens. A connector employing such optics may, for instance, be effectively mated to either a similar connector with the same optics or to a connector having no lens. Specifically, it may effectively be mated to a second connector having no lens via a second connector structure that places the receiving optical component at the image point of the imaging optics of the first connector. Alternately, such a connector may be effectively mated to a second connector having an identical lens to the first connector provided that the first and second connector structures are adapted to mate such that the image points of the two lenses are coincident.

DETAILED DESCRIPTION OF EMBODIMENTS

Conventionally, an optical connector employing an expanded beam coupling includes a separate lens for each optical component. The following discussion shall refer to an embodiment in which the optical components are optical fibers. However, it should be understood that this is merely exemplary and that the invention is applicable to the interfacing of any two optical components, including any combination of optical components, such as fibers, wave guides, and optoelectronic devices, such as photodiodes, photodetectors, and optical and optoelectronic receivers, transmitters, and transceivers. Specifically, the optical fibers of a fiber optic cable typically are inserted into a ferrule of the connector, the ferrule precisely aligning the fibers contained therein laterally (i.e., transverse the optical axis of the fiber) in the connector for optical coupling to the corresponding fiber in a mating connector. A lens is disposed at the front end of each fiber for collimating the beam exiting the fiber (or focusing a beam on the front face of the fiber, in the case of light traveling in the other direction, i.e., into the fiber from the corresponding fiber of a mating connector).

Figure 1:
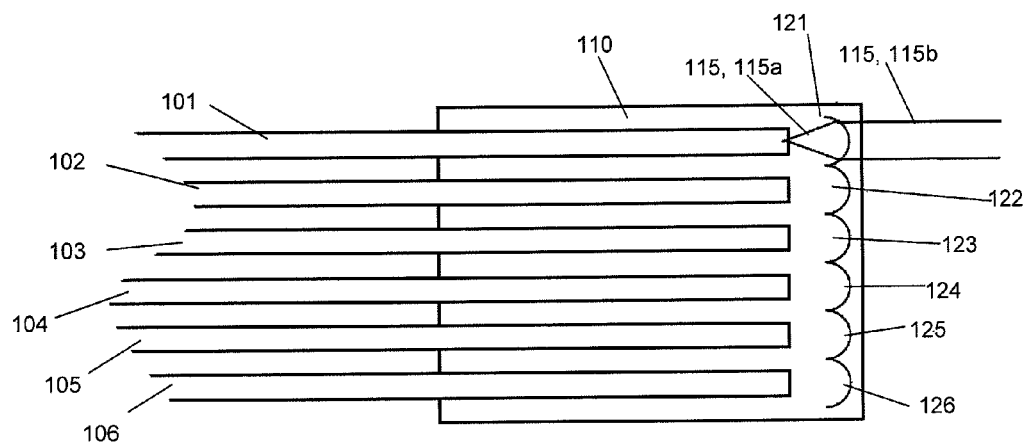
FIG. 1 is a schematic diagram of a multi-fiber, expanded beam optical connector of the prior art.

FIG. 1 is a schematic diagram illustrating the basic components of a conventional expanded beam connector. In order not to obfuscate the drawings, the Figures illustrate the path of beams for only one of the multiple fibers. A plurality of optical fibers 101, 102, 103, 104, 105, 106 enter the back of the connector body 110 and terminate at end faces near the front of the connector body 110. The connector body is adapted to releasably mate to another connector body to provide a separable optical interface between two optical components. Such connectors are well known in the optical arts and include such well-known standardized form factors as MPO, SC, ST, FC, and LC. A lens 121, 122, 123, 124, 125, 126 (represented schematically in the figures as a single curved line, but understood by those skilled in the relevant arts to be an actual three dimensional lens) is positioned in front of the end face of each fiber 101-106. The lenses 121-126 are collimating lenses. More specifically, a light beam 115 exits from each fiber 101-106 (only one beam, emanating from fiber 101 is shown in the Figure) generally starts with a spot size approximately equal to the diameter of the fiber core (e.g., 10 microns for single-mode or 50 microns for multi-mode fibers) and starts to diverge (see beam segment 115a in the Figure) as soon as it exits the front end face of the fiber. Each lens 121-126 receives the light from the diverging beam of light 115 and collimates it so that an expanded diameter, collimated beam (see beam segment 115b of beam 115 in the Figure) exits from the front end of the lens 121. The expanded collimated beam 115b is less affected by dust particles and other dirt between the connector 110 and a mating connector to which it is connected in a transmission system because the expanded, collimated beam diameter is much larger than the original beam width. An expanded beam connector generally is intended to be connected to another expanded beam connector of the same design and containing the same lenses so that the lenses in the other connector will receive the collimated, expanded beams and focus those collimated light beams back down to points at the end faces of the fibers in that connector.

An expanded beam connector such as illustrated in FIG. 1 cannot be effectively coupled to a more conventional connector that does not contain collimating optics because only a tiny portion of the light of the expanded beams emanating from the lenses of the expanded beam connector could enter the fibers of the non-expanded beam connector. That is, most of the light of the expanded beam would be outside of the aperture of the intended receiving fiber.

Figure 2:
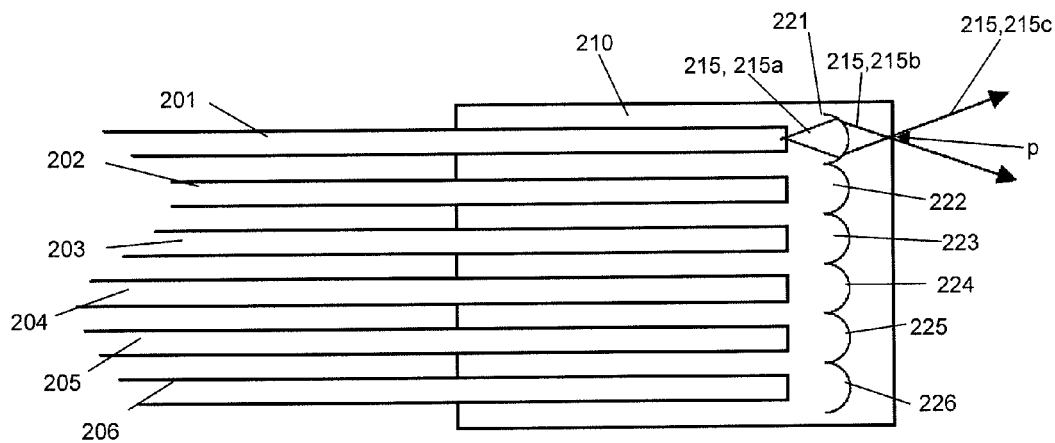
FIG. 2 is a schematic diagram of a multi-fiber, expanded beam optical connector in accordance with the principles of the present invention.

FIG. 2 is a schematic diagram of an optical connector 210 in accordance with the principles of the present invention in which the interface includes optics, e.g., a lens, just like an expanded beam connector, but instead of employing a collimating lens, it employs an imaging lens. For instance, a refractive imaging lens 221, 222, 223, 224, 225, 226 is placed in front of the end face of each fiber 201, 202, 203, 204, 205, 206 to image the light in the lens to an image point, p. Note that, in this embodiment, the image point p is exactly at the front end of the connector body 210. The lens can take many forms, including singlet, multi-piece, and holographic (see U.S. Pat. No. 6,012,852) lenses.

As can be seen in FIG. 2, the beam 215 exits the fiber 201 as in FIG. 1, namely, as a diverging beam, as illustrated by first beam segment 215a. When it strikes the imaging lens 221, the lens images the light to image point p, as illustrated by beam segment 215b of beam 215. Beyond image point p, the beam 215 starts to diverge again as illustrated by beam segment 215c in FIG. 2.

This interface has several advantages over the more conventional expanded beam connectors such as illustrated in FIG. 1. First, this is essentially an expanded beam interface since, just as in an expanded beam connector utilizing a collimating lens, the beam is expanded at the front surface of the lens. Although the beam converges to an image point, that image point is not necessarily on a surface to which dust may stick. Rather, as will become clear from the following discussion, the image point may be in air, where dust cannot stick and thus is less of a concern. Hence, the diverging beam interface of FIG. 2 has many of the same advantages as a collimating beam connector. Furthermore, if such a connector were left disconnected, the light that would escape from the connector would be a diverging beam as can be seen in FIG. 2. This is safer than the collimating lenses of FIG. 1 in that, if the diverging beam were to enter a person's eye at a distance from the connector, it would be much less dangerous than a collimated beam, which would be much more concentrated than the continually diverging beam of the present invention. Of course, at or very near the image point p of the lens in the interface of the present invention, the beam is actually more concentrated than that of a collimated beam interface. However, as a practical matter, it is highly unlikely that a person would be accidentally exposed to beams emanating from an optical connector with his or her eye so close to the connector.

Another advantage is the fact that an optical connector employing such imaging lenses may be effectively coupled to either another connector of the same design or to a connector containing no optics in front of the fibers. More specifically, a connector employing the principles of the present invention can effectively couple light from its fibers to the fibers in another connector regardless of whether that other connector is a similar connector employing another imaging lens in accordance with the principles of the present invention or a more conventional connector with no optics in front of the fiber end faces.

Figure 3:
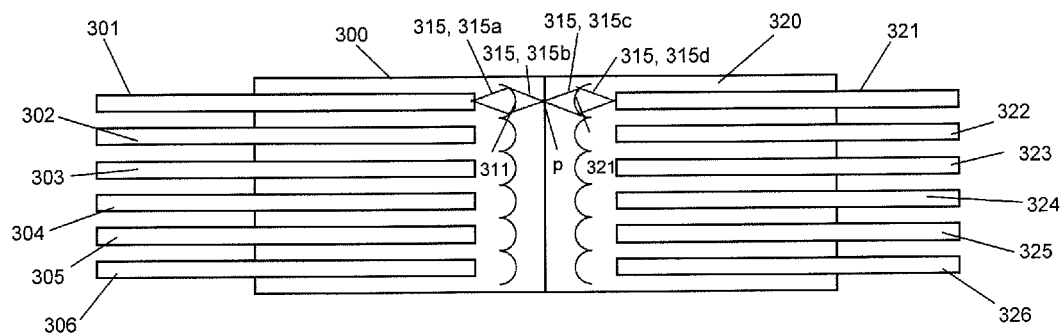
FIG. 3 is a schematic diagram of a two mated multi-fiber, expanded beam optical connectors in accordance with the principles of the present invention.
Figure 4:
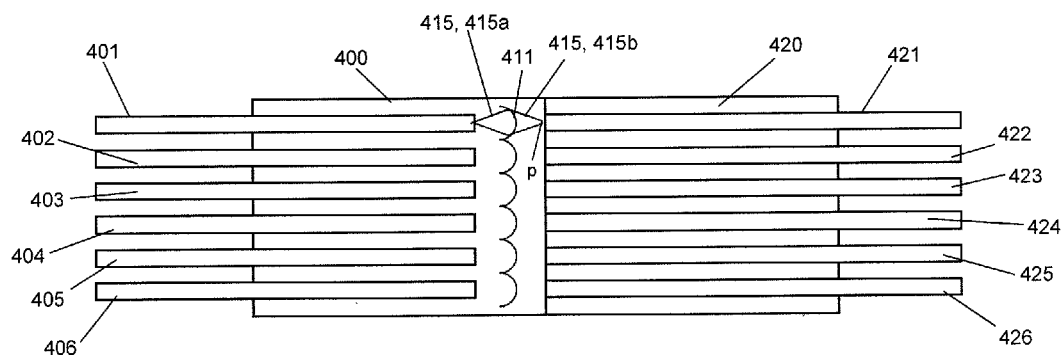
FIG. 4 is a schematic diagram of a multi-fiber, expanded beam optical connector in accordance with the principles of the present invention mated to an optical connector of the prior art bearing no optics.

FIGS. 3 and 4 illustrate this fact. Particularly, FIG. 3 illustrates two connectors employing imaging optics in front of their respective fibers in accordance with the principles of the present invention and showing how the light may be focused to an image point on the front face of a receiving fiber. FIG. 4, on the other hand, shows a connector of the present invention employing imaging optics connected to a conventional connector (bearing no optics in front of its fibers) showing how the beams still may be imaged to a point on the front face of a receiving fiber.

Referring first to FIG. 3, the two connector bodies 300, 320 are adapted to couple together so as to laterally align each fiber 301, 302, 303, 304, 305, 306 in the first connector with a corresponding fiber 321, 322, 323, 324, 325, 326 in the second connector 320 with which it is intended to couple light. Such connectors are well known in the related arts, such as MT style connectors, and require no further discussion with respect to achieving proper lateral alignment. The beam 315 emanating from fiber 301 of first connector 300 diverges as it exits the fiber 301 (as illustrated by beam segment 315a) until it enters lens 311 (represented schematically in the figures as a single curved line, but understood by those skilled in the relevant arts to be an actual lens having a depth). The lens 311 images the beam to an image point p (as illustrated by beam segment 315b in FIG. 3).

A second, identical connector 320 is coupled to the first connector 300. The two connectors are designed so that, when they are coupled together, the image points of the two lenses are substantially coincident. Thus, the beam, which is imaged to point p, diverges past that point (as illustrated by beam segment 315c in FIG. 3) until it strikes the front of lens 321 of connector 320. Lens 321 will image the beam back to a second image point at the same distance behind the front surface of lens 321 as the distance between the fiber and the front of the lens in 301 in connector 300, where the end face of the receiving fiber 321 is positioned.

Thus, two connectors bearing the same optics effectively couple light between two fibers provided that the connectors are designed to position the two lenses with their image points substantially coincident.

Note that, the optics of the two mating lenses do not necessarily have to be identical. If the optics are not identical, then the distance between the fronts of the two lenses may be adjusted to assure maximum coupling of light.

Turning to FIG. 4, the two connector bodies 400, 420 are adapted to couple together so as to laterally align each fiber 401, 402, 403, 404, 405, 406 in the first connector 410 with a corresponding fiber 421, 422, 423, 424, 425, 426 in the second connector 420 with which it is intended to couple light. The beam emanating from fiber 401 of first connector 400 diverges as it exits the fiber 401 until it enters lens 411. Just as in FIG. 3, the lens 411 images the beam to an image point p. A second connector 420 bearing no optics in front of its fibers 421, 422, 423, 424, 425, 426 is coupled to the first connector 400. If the second connector 420 is designed so that the front face of fiber 421 is positioned at position p, then the front end face of that fiber will be at the image point of the beam. The same is true of the other fibers 402-406.

Thus, two connectors bearing the same optics can effectively couple light between two fibers. However, even further, one connector with imaging optics and another connector with no optics in front of the fiber can effectively couple light between two fibers as long as the fiber of the unlensed connector is positioned at the image point p of the lens in the lensed connector.

It will be apparent to those of skill in the art of optics that light traveling in the opposite direction than the ones described above in connection with FIGS. 3 and 4 will behave in exactly the complementary fashion so that light can be coupled between the mating fibers of the two connectors in both directions. For instance, the behavior of a beam transmitted in the opposite direction through the interface of the FIG. 3 configuration is trivial. Since the two connectors are identical, the behavior of beams travelling through the interface in the opposite direction is identical. In fact, the beam rays illustrated in FIG. 3 are representative of light travel in both directions (only the direction of the rays would be opposite from each other).

The same is true of the FIG. 4 configuration also. That is, the beam rays shown in FIG. 4 would be equally representative of the ray paths of light travelling on the opposite direction through the interface. Particularly, a diverging beam will exit the front end face of the fiber and diverge until it strikes the front of lens 411 in connector 400, which will image the beam to an image point at the end face of fiber 401.

The inventive optical interface can provide backwards compatibility to conventional connectors that do not have optics in front of the fibers. For instance, a conventional MT connector does not have optics in front of the fibers. Thus, if the principles of the present invention were incorporated into MT style connectors, such imaging connectors could effectively be coupled to identical imaging MT connectors as well as conventional MT connectors.

Since the lens forms an image of the fiber at p, the tolerances to lateral and angular misalignment are essentially the same between two imaging connectors of the present invention as between two non-lensed connectors. One important advantage of this is that the mechanical system used to align two ferrules can be the same for two non-lensed connectors, two imaging connectors, or an imaging connector mated to a non-lensed connector. For example, an MT ferrule or a single fiber ferrule is designed to accurately control the lateral alignment of two mating ferrules. However, the angular alignment is not tightly controlled, because it is not required in a non-lensed, fiber-fiber application. If a collimating lens of the prior art is used to make an expanded beam connector, then the angular alignment of the two ferrules must be very accurate, and may not be achievable using standard connector hardware. The present invention has no such issues.

The discussion above describes an ideal optical system in which light is imaged onto point "p". Such an ideal optical system can be reasonably realized by a "point source" such as a single mode fiber. However, the larger core of a multi-mode fiber may not reasonably approximate an ideal point source. Hence, optical design software such as ZEMAX™ may be used to optimize the transmission of light for the two configurations depicted in FIGS. 3 and 4. Thus, it will be understood by those skilled in the optics arts that the optimal solution may not necessarily form an exact image as that term is typically used in the optical industry.

While the invention has been described herein above in connection with embodiments for coupling optical transports to one another, it is applicable in any situation where light is to be coupled between light emitting and/or receiving (hereinafter light exchanging) faces of two optical components. This includes optical transports, such as optical fibers and waveguides, as well as optoelectronic components, such as photodiodes, photodetectors, lasers, or any other optoelectronic receiver, transmitter or transceiver. For instance, in a coupling between an optoelectronic transmitter and an optical fiber, the transmitter may be equipped with an imaging lens in accordance with the principles of the invention and may be optically coupled to an optical fiber that is terminated with a connector that is either unlensed or outfitted with an imaging lens in accordance with the invention.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A separable optical interface assembly comprising:
   a ferrule having an end face and defining a cavity at said end face;
   at least one optical component disposed in said ferrule and having a light exchanging face; and
   a converging lens positioned between said light exchanging face and said end face, and adapted to receive a beam emanating from the light exchanging face and image it to an image point, said point being positioned in said cavity at said end face.

2. The assembly of claim 1, wherein said optical component is a fiber.

3. The assembly of claim 2, wherein said ferrule is a multi-fiber ferrule.

4. The assembly of claim 3, wherein said ferrule is an MT-type ferrule.

5. The assembly of claim 1, wherein said ferrule is a lensed ferrule comprising said converging lens.

6. The assembly of claim 5, wherein said converging lens comprises a discrete lens for each optical component.

7. The assembly of claim 1, wherein said converging lens comprises a refractive lens.

8. The assembly of claim 1, wherein said ferrule is configured to releasably engage a mating ferrule.

9. The assembly of claim 8, further comprising alignment features being configured to releasably engage a mating connector.

10. The assembly of claim 1, wherein said optical component is an optical waveguide.

11. An optical connector system comprising:
    a first optical connector comprising at least:
      a first ferrule having a first end face;
      at least one first optical component having a first light exchanging face in said first ferrule; and
      a converging lens positioned between said light exchanging face and said end face, and adapted to receive a beam emanating from the light exchanging face and image it to an image point, said image point being positioned at said end face; and a second optical connector comprising at least:
- a second ferrule having a second end face in contact with said first end face; and
- at least one second optical component in said second ferrule having a second light exchanging face that is coplanar with said second end face such that said image point is positioned at said second light exchanging face.

12. The connector system of claim 11, wherein said first ferrule defines a cavity at said end face.

13. The connector system of claim 11, wherein said first and second ferrules are MT-type ferrules.

14. The connector system of claim 11, wherein said first ferrule is a lensed ferrule comprising said converging lens.

15. The connector system of claim 14, wherein said converging lens comprises a discrete lens for each optical component.

16. The connector system of claim 11, wherein said at least one second optical component is a fiber and said second light exchanging face is said fiber's end face.

17. The connector system of claim 11, wherein said first and second ferrules are configured to releasibly engage one another.

18. The connector system of claim 17, wherein said first and second ferrules comprise alignment features being configured to releasibly engage one another.

19. The connector system of claim 18, wherein said alignment features comprise at least one alignment pin and at least one alignment hole configured to receive said alignment pin.

* * * * *